April 7, 1925.
P. D. CORMIER
1,532,528
APPARATUS FOR REMOVING CARBON FROM INTERNAL COMBUSTION ENGINES
Filed Aug. 23, 1923     2 Sheets-Sheet 1
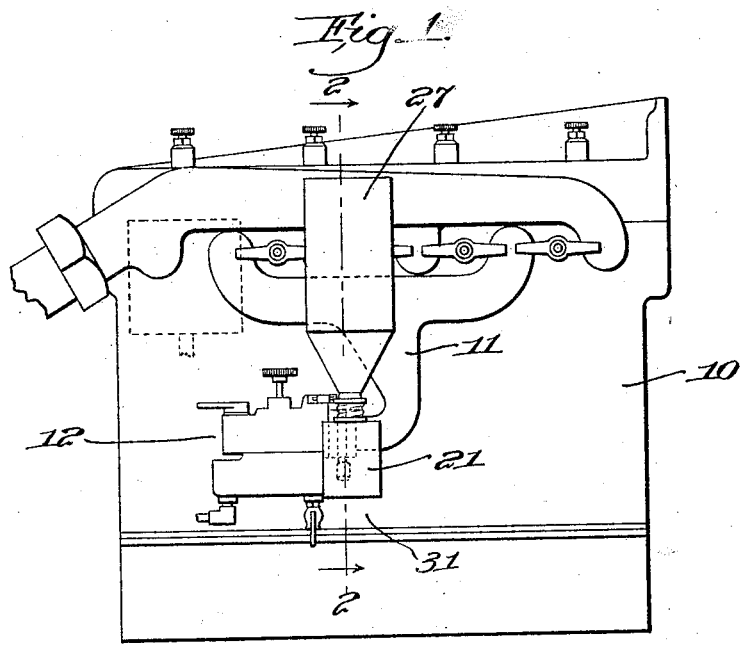
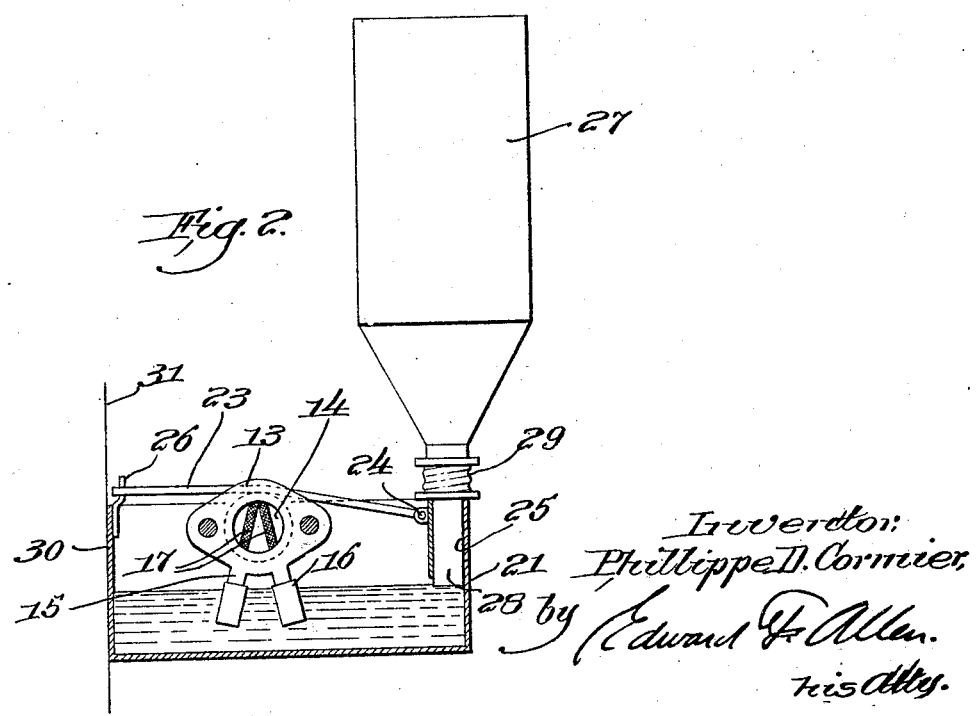
Inventor:
Phillippe D. Cormier,
by Edward F. Allen.
his Atty.

April 7, 1925.
P. D. CORMIER
APPARATUS FOR REMOVING CARBON FROM INTERNAL COMBUSTION ENGINES
Filed Aug. 23, 1923  2 Sheets-Sheet 2
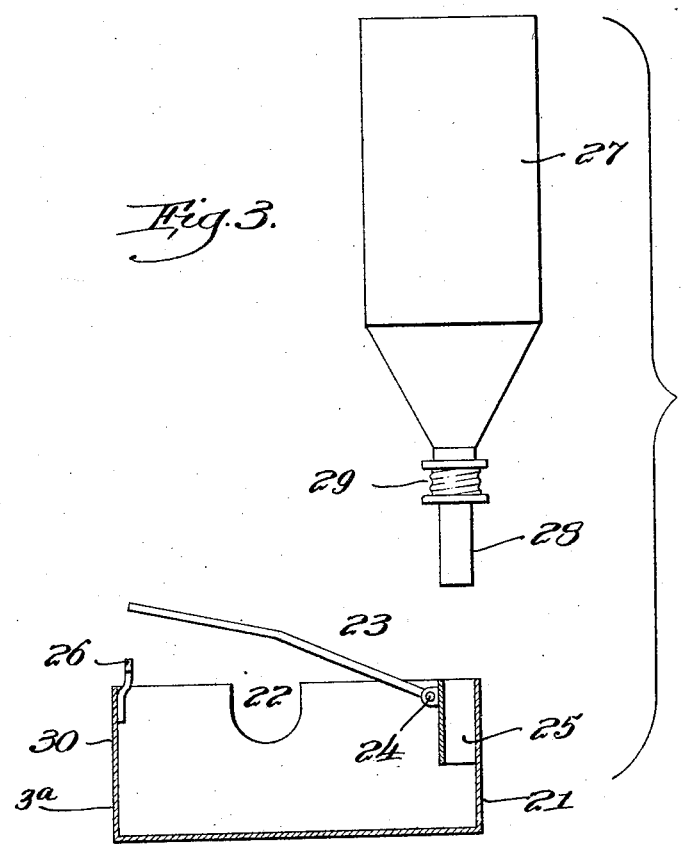
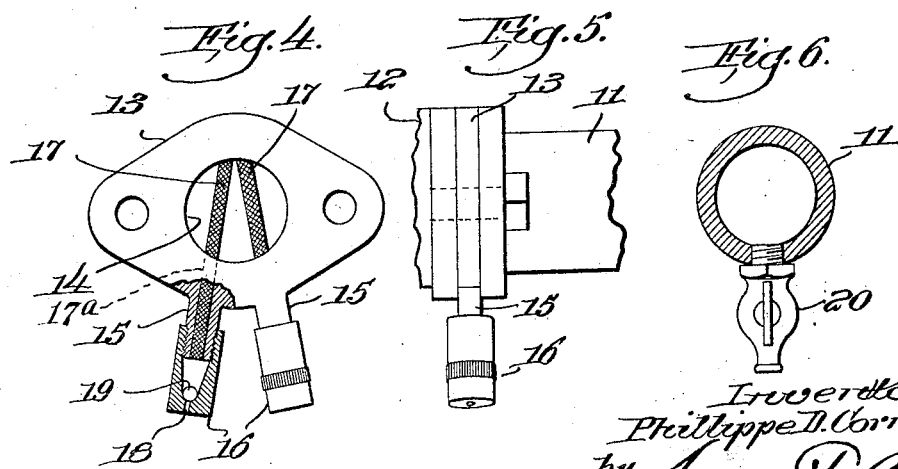

Patented Apr. 7, 1925.

1,532,528

UNITED STATES PATENT OFFICE.

PHILLIPPE D. CORMIER, OF NEW BEDFORD, MASSACHUSETTS.

APPARATUS FOR REMOVING CARBON FROM INTERNAL-COMBUSTION ENGINES.

Application filed August 23, 1923. Serial No. 658,894.

*To all whom it may concern:*

Be it known that I, PHILLIPPE D. CORMIER, a citizen of the United States of America, and a resident of New Bedford, in the county of Bristol and Commonwealth of Massachusetts, have invented certain new and useful Improvements in Apparatus for Removing Carbon from Internal-Combustion Engines, of which the following is a specification.

This invention relates to apparatus for removing carbon from internal combustion engines.

It is an object of the invention to produce a simple and cheap time saving apparatus which may be readily applied to internal combustion engines for the purpose of removing carbon therefrom.

As is well known, in the removal of carbon very beneficial results have been attained by the occasional injection of water, steam, kerosene or so called prepared carbon removing compounds into the engine, and it has also been found that air, whether hot or cold, injected into the intake manifold at a point preferably close to the carbureter, has proven of great value in attaining more perfect combustion.

The present invention relates more particularly to engines which are provided with an auxiliary intake located as above but not necessarily limited thereto, as by the addition of a simple pet cock to the intake manifold of engines not previously provided with such intake, the invention may be used with equally good results.

It is therefore a further object of the invention to provide internal combustion engines with an auxiliary intake in combination with apparatus readily attachable to the engine, and preferably of a knock down type for temporary use, or when it is required to remove carbon.

It is also an object of the invention to provide a compact liquid receptacle which, by reason of its application, is necessarily limited as to capacity, but which is provided with means to automatically feed it when the liquid therein is exhausted to a predetermined level.

Heretofore various crude and cumbersome means were employed to inject liquids into the engine, sometimes the priming cups were utilized for the purpose, which is unsatisfactory, and in instances wherein the engine was provided with an auxiliary air intake, a small cup or receptacle filled with a very limited amount of liquid was held to the intake by hand, and which at very frequent intervals had to be replenished, which is also an unsatisfactory and time wasting operation.

Another object of the invention is to provide an apparatus for the purpose of carbon removal, which when adjusted for use, is automatic in its action, and which does not require the attention of an attendant until such time as it has accomplished its work, or is to be detached from the engine.

The invention consists in a receptacle for liquid which is attachable to an engine for temporary use, and which is fed from a reservoir adapted to maintain a given level of liquid in said receptacle, in combination with intake means.

The invention further consists in certain novel features of construction and arrangement of parts which will be fully understood from a description of the drawings and the claims hereinafter given.

Of the drawings:

Figure 1 represents in side elevation a sufficient portion of an internal combustion engine with the invention applied thereto, to enable it to be understood.

Figure 2 a section approximately on the line 2—2, Figure 1, some of the parts being broken away or omitted, and others shown in elevation for clearness.

Figure 3 shows the liquid receptacle and its reservoir as detached from the engine and from each other.

Figure 4 shows in face view on enlarged scale a form of vaporizer having air intakes, with which the present invention conveniently co-operates.

Figure 5 a view looking toward the left Figure 4, showing a portion of a well known carbureter and an intake manifold between which the vaporizer shown in Figure 4 is adapted to be adjusted.

Figure 6 shows a transverse section through a portion of an intake manifold having attached thereto a simple pet cock for the purpose of this invention.

Like characters represent like parts throughout the several figures of the drawings.

Referring to the drawings:

The drawings herewith illustrate the invention as applied to a well known type of engine 10, having the usual intake manifold 11, and carbureter 12, but it will be understood that it is not the intention to limit the invention to this particular type of engine, nor to the precise construction and arrangement shown herein as slight changes might be made therein without departing from the spirit and scope of the invention.

For the purpose of economy in the use of fuel, many engines are equipped with vaporizers such for instance as shown in Figures 2, 4 and 5.

This type of vaporizer which consists of a washer-like plate 13 adapted to be applied to the engine between the intake manifold 11 and carbureter 12, see Figure 5, has a passage 14 therethrough which corresponds with that of the said intake and carbureter.

The said plate 13 has downwardly and angularly projecting nipples 15, threaded to receive caps 16, and having holes 17$^a$ bored therethrough in which are inserted rolls of fine mesh wire screening 17.

The caps 16 have inlet holes 18 which are normally closed by means of balls 19 the said balls being adapted to be lifted from their seats during certain speeds of the engine to thereby enable air or fluid to be drawn into the intake manifold directly in the path of the fuel mixture, which may be drawn simultaneously from the carbureter or other mixture producing device 12.

The above briefly explained vaporizer is one of many types which are or may be used, but in the absence of such a vaporizer, the present invention contemplates the use of a pet cock 20, see Figure 6, which is easily applied to the intake manifold 11 at but slight expense.

As the present invention operates equally well with either of the above described devices, it will be understood that it is not intended to limit the invention to the particular form or type of auxiliary intake used in connection therewith.

It is preferred that the apparatus carrying out the invention be made applicable to, and removable from the engine at will, or at such times as carbon removal becomes necessary, but it will be understood that if desired it may be made a permanent feature by the introduction of old and well known securing devices such as strap and bolts.

The drawings however show a liquid receptacle 21, having two of its walls cut away as at 22, to span that portion of the intake manifold where the auxiliary intake is located.

A bail 23, pivoted at 24 to the outer wall of a socket 25 to be explained, is provided and adapted to be swung over the intake manifold, see Figure 2, and locked to the receptacle 21 by means of a catch 26 of suitable construction.

As the quantity of liquid necessary for the satisfactory removal of carbon is usually greater than the capacity of a receptacle that could be conveniently used, a reservoir 27 is employed which is preferably removable from the said receptacle for the purpose of replenishing the liquid therein, and for storage or shipment.

The reservoir 27 is provided with a removable tubular spout-like extension 28, which is adapted to be inserted in the socket 25 when the apparatus is ready to operate as shown in Figures 1 and 2.

The socket 25 has open communication at the bottom thereof, with the receptacle 21, and consequently the level of the liquid it is desired to maintain in the said receptacle is governed by the length of the spout extending into the receptacle or the socket therefor, formed therein.

The spout 28 is formed with a screw thread 29 adapted to engage a like thread, not shown, of the reservoir 27, and if desired may be removed from the reservoir, reversed, and the spout inserted for the purpose of compactness in shipping or storage.

In use, the reservoir will first be filled with the desired amount and kind of liquid, and assembled with the receptacle, at which time the liquid will flow into the receptacle until the level has reached the lower end of the spout.

The apparatus will now be adjusted to the intake manifold and secured thereto by the bail 23, which combined with the contact of the end wall 30 of the receptacle with the side 31 of the engine 10 will secure it in position.

When a pet cock, such as seen in Figure 6, is used it will be opened the required amount and the engine started and allowed to run at a fair rate of speed without the personal attention of an attendant.

As piston movement takes place to draw in a quantity of fuel mixture, it will at the same time draw in a quantity of the liquid from the receptacle 21, which intermingles with the fuel mixture, and upon ignition thereof, steam is formed which has a very beneficial effect upon the parts of the engine having carbon deposits therein, removing it therefrom in a short time, and in a manner which is not harmful thereto, or costly.

As the liquid is thus drawn from the receptacle and the level thereof in the said receptacle has been lowered to a level below the mouth of the spout a fresh supply will flow from the spout until the level has again reached the mouth thereof and the flow will cease.

This action will continue until such time as the reservoir is exhausted and the liquid level in the receptacle falls below the holes 18 of the vaporizer or the end of the pet cock 20.

If at this time the engine is not stopped no harm is done.

In instances wherein a pet cock is introduced into the intake manifold, its use is not limited to that of the present invention, but may be used for the purpose of priming the engine, and therefore it constitutes a useful adjunct and not an unnecessary encumberance.

Having described the invention I claim:

1. In an apparatus of the class described, an engine; a receptacle for liquid adapted to be temporarily secured thereto; a reservoir mounted on said receptacle and adapted to supply said receptacle and arranged to maintain an approximately given level of liquid in said receptacle, said reservoir being removably attached thereto by a single quick detachable securing device; and an air intake adapted to be immersed in liquid contained in said receptacle and to draw said liquid into said engine.

2. In an apparatus of the class described, an engine having an intake manifold; an air intake in said manifold; a receptacle for liquid adapted to be positioned in co-operative relation to said air intake; means to temporarily secure said receptacle to said engine; a liquid supply reservoir adapted to be removably attached to said receptacle, and provided with means including a depending outlet extending into said receptacle to maintain an approximately given level of liquid in said receptacle.

3. In an apparatus of the class described, an engine having an intake manifold; an air intake mounted on said manifold; an open receptacle having notched side walls adapted to span said intake manifold and so constructed that its end wall abuts said engine; means to removably secure said receptacle to said engine adjacent said intake; and a reservoir adapted to be removably mounted on and above said receptacle, said reservoir having a spout adapted to extend into said receptacle a predetermined distance whereby an approximate level of liquid may be maintained in said receptacle.

4. In an apparatus of the class described, an engine having an intake manifold; a carburetor; an air intake mounted on said intake manifold intermediate said engine and said carburetor; a receptacle for liquid adapted to be temporarily adjusted to said intake manifold adjacent said air intake; a bail adapted to temporarily secure said receptacle to said manifold; and a reservoir having a spout extending into said receptacle to a predetermined depth, and adapted to be removably attached to said receptacle.

5. In an apparatus of the class described, an engine; a fuel intake therefor; a quick detachable knock-down unit comprising a liquid receptacle and a reservoir detachably mounted on said receptacle; means including an auxiliary air intake to at times coact with said fuel intake and said receptacle whereby liquid may be drawn from said receptacle into said engine.

6. In an apparatus of the class described, an engine; a fuel intake therefor; a knock-down unit adapted to be temporarily applied to said fuel intake, and comprising a liquid receptacle, and a feed reservoir detachably mounted on said receptacle, said reservoir extending into said receptacle a predetermined distance whereby an approximate level of liquid may be maintained in said receptacle; and auxiliary air intake means adapted to be immersed in liquid of said receptacle and coacting with said fuel intake whereby liquid may be drawn from said receptacle into said engine.

Signed by me at New Bedford, Massachusetts this 18th day of August, 1923.

PHILLIPPE D. CORMIER.